3,128,483
METHOD OF MAKING A THREADED STUD WITH WRENCH-RECEIVING PORTION
Harrington Moore, East Acton, Mass.
(100 Beaver St., Waltham, Mass.)
Filed July 12, 1960, Ser. No. 42,364
1 Claim. (Cl. 10—10)

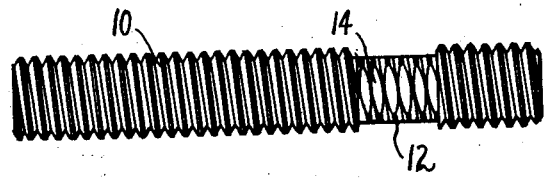
F I G. 1
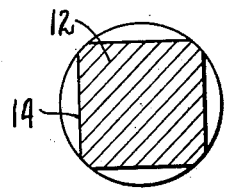
F I G. 2
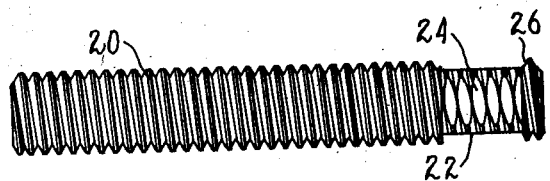
F I G. 3
INVENTOR.
HARRINGTON MOORE
BY
ATTORNEYS

# United States Patent Office 3,128,483
Patented Apr. 14, 1964

This invention relates to a method of making screw-threaded studs with a squared portion spaced from both ends thereof to receive the jaws of an ordinary wrench by which the stud can be turned. The usual practice in making studs is to thread the end portions, leaving an intermediate portion unthreaded to which a Stillson wrench can be applied for the purpose of turning the stud, or to start with a piece of prismatic stock, shave end portions of the piece to cylindrical form, then thread these cylindrical portions. The faces of the intermediate prismatic portion of the piece are adapted to receive the jaws of an ordinary wrench if the prism has an even number of faces. In some cases where the wrench-receiving portion is near one end of the stud, it is difficult to make a thread of short length. The present invention has to do with a quick and economical method of making such studs with any desired lengths of threaded portions between the respective ends and the portion which receives a wrench.

According to the invention, the stud is made by screw-threading a piece of rod stock, then swaging an intermediate portion of the threaded rod to flatten the convolutions of the thread on such portion so as to form there a prism having any desired even number of sides, preferably four or six. On the drawing—

FIGURE 1 is an elevational view of a stud embodying the invention;

FIGURE 2 is an enlarged sectional view on a plane through the swaged portion of the stud; and FIGURE 3 is an elevational view of a stud having the swaged portion near an end thereof.

Studs embodying the invention are made of rod or coil stock pieces of which are cut off to desired lengths and are screw-threaded, the threading being done either before or after the piece is cut off. This results in a stud 10 which is threaded from end to end. An intermediate portion 12 of the stud is swaged by suitable tools such, for example, as a press similar to that shown in Patent No. 2,024,593 to flatten crest portions at spaced points of each convolution of thread in the swaged area so that the crests are mashed at such points into the adjacent thread valleys. This results in flattened areas 14 which collectively form substantially continuous faces to be engaged by the jaws of a wrench, four such faces being on each of the studs illustrated on the drawing. Thus the cross-section of the swaged portion 12 as shown in FIGURE 2 is a square with truncated corners. If preferred, a greater or lesser even number of faces can be made on the swaged portion.

The stud 20 shown in FIGURE 3 is like that shown in FIGURE 1 except that the swaged portion 22 with flattened areas 24 is very close to an end of the stud, there being only a single convolution 26 of thread or even less, between the swaged portion of the stud and the adjacent end. This is merely illustrative of the fact that according to the invention the swaged portion can be made as close as desired to an end of the stud. In some cases this degree of proximity is desirable.

I claim:

A method of making a stud having threads at each end and a wrench-receiving portion intermediate the ends, which comprises screw-threading a length of rod stock, cutting off a piece of said stock of desired length which is threaded from end to end, and swaging an intermediate portion only of said piece at an even number of points to completely flatten the crest portions of the thread convolutions in said portion forcing the crest metal in the adjacent thread valleys to form an even number of wrench-receiving plane faces on said portion of the piece.

References Cited in the file of this patent
UNITED STATES PATENTS

| | | |
|---|---|---|
| 402,271 | Mutimer | Apr. 30, 1889 |
| 942,506 | Levedahl | Dec. 7, 1909 |
| 1,401,302 | Axelson | Dec. 27, 1921 |
| 1,649,310 | Joline | Nov. 15, 1927 |
| 2,056,053 | Moore | Sept. 29, 1936 |
| 2,121,979 | Peirce | June 28, 1938 |
| 2,414,870 | Harding | Jan. 28, 1947 |
| 3,076,208 | Moore | Feb. 5, 1963 |